United States Patent
Lee et al.

(10) Patent No.: US 7,796,992 B2
(45) Date of Patent: Sep. 14, 2010

(54) RESOURCE RESERVATION SYSTEM AND METHOD IN WIRELESS NETWORK

(75) Inventors: Su-Won Lee, Seognam-si (KR); Sung-Hyuck Lee, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 734 days.

(21) Appl. No.: 11/713,796

(22) Filed: Mar. 5, 2007

(65) Prior Publication Data
US 2007/0274221 A1 Nov. 29, 2007

(30) Foreign Application Priority Data
Mar. 4, 2006 (KR) .................. 10-2006-0020736

(51) Int. Cl.
*H04W 36/00* (2009.01)
(52) U.S. Cl. .............. 455/436; 455/403; 455/422.1; 455/437; 455/438; 455/439; 455/440; 455/441; 455/442; 455/443; 455/444; 370/331
(58) Field of Classification Search .............. 455/422.1, 455/436, 437, 438, 439, 440, 441, 442, 443, 455/444, 525; 370/229, 331
See application file for complete search history.

(56) References Cited
U.S. PATENT DOCUMENTS

| 5,396,543 | A | * | 3/1995 | Beeson et al. ............... 455/560 |
| 5,787,348 | A | * | 7/1998 | Willey et al. ................ 455/441 |
| 6,049,715 | A | * | 4/2000 | Willhoff et al. ............. 455/436 |
| 6,496,505 | B2 | * | 12/2002 | La Porta et al. ............. 370/392 |
| 6,807,163 | B1 | * | 10/2004 | Shi ............................ 370/337 |
| 7,239,875 | B2 | * | 7/2007 | Bernhard et al. ............ 455/443 |
| 7,460,869 | B2 | * | 12/2008 | Pekonen et al. ............. 455/436 |
| 7,512,068 | B1 | * | 3/2009 | Ghaderi Dehkordi et al. ......................... 370/230 |
| 2002/0107026 | A1 | * | 8/2002 | Agrawal et al. ............. 455/453 |
| 2003/0112766 | A1 | * | 6/2003 | Riedel et al. ................. 370/252 |
| 2003/0224786 | A1 | * | 12/2003 | Lee et al. .................. 455/432.1 |
| 2005/0009548 | A1 | * | 1/2005 | Kelley et al. ................ 455/509 |
| 2006/0205406 | A1 | * | 9/2006 | Pekonen et al. ............. 455/436 |
| 2008/0013493 | A1 | * | 1/2008 | Wu et al. .................... 370/331 |
| 2008/0151811 | A1 | * | 6/2008 | El-Damhougy et al. ..... 370/316 |

* cited by examiner

*Primary Examiner*—Danh C. Le
*Assistant Examiner*—Ronald Eisner
(74) *Attorney, Agent, or Firm*—NSIP Law

(57) ABSTRACT

A resource reservation system and a method for managing resources under consideration of the mobility of an MN are provided where an old refresh interval for an old resource reservation state is changed in response to handoff. The changed refresh interval propagates through at least one of a path supporting a corresponding session before the handoff and a path newly established due to handoff occurrence. When the handoff is completed, resources are released on a path, which is a part of the path supporting the corresponding session before the handoff and is not used due to the handoff occurrence, based on the changed refresh interval.

24 Claims, 10 Drawing Sheets

RESOURCE RESERVATION SYSTEM AND METHOD IN WIRELESS NETWORK

CROSS-REFERENCE TO RELATED APPLICATIONS

This application claims the benefit under 35 U.S.C. §119 (a) of Korean Patent Application. No. 2006-020736, filed on Mar. 4, 2006, in the Korean Industrial Property Office, the entire disclosure of which is hereby incorporated by reference.

BACKGROUND OF THE INVENTION

1. Field of the Invention

The present invention relates to a resource reservation system and method in a wireless network. More particularly, the present invention relates to a resource reservation system and method in a wireless network, which provides resource management under consideration of the mobility of a mobile node.

2. Description of the Related Art

A resource reservation state management scheme is employed in a wireless network in order to ensure Quality of Service (hereinafter referred to as "QoS"). This resource reservation state management scheme is a state management scheme in which resources are reserved in advance and used session by session.

Such a state management scheme may be largely classified into a hard-state-based scheme and a soft-state-based scheme. In the hard-state-based state management scheme, resources according to a corresponding session are released by a session release request issued from the subject of the corresponding session. In the soft-state-based state management scheme, resources according to a corresponding session are released by a session maintenance request cyclically issued from the subject of the corresponding session.

FIG. 1 is a view comparing the performance of the hard-state-based state management scheme with that of the soft-state-based state management scheme.

As seen from FIG. 1, the hard-state-based state management scheme shows relatively better performance when a network condition is good, but the soft-state-based state management scheme shows relatively better performance when a network condition is not good.

A typical example of the soft-state-based state management scheme is a Resource Reservation Protocol (hereinafter referred to as "RSVP"). The RSVP defines procedures for ensuring resources in order to guarantee requirements of Internet application services. The RSVP operates on a packet belonging to a specific session, and one session is defined by a destination IP (Internet Protocol) address, a transport protocol type and a destination port number. The RSVP can be said to be a signal protocol on the Internet for setting up routing states in routers in order to satisfy requirements of services defined in an Internet integrated service model.

The RSVP operates in a simplex mode. That is, both end hosts request resources in different directions. Thus, in the RSVP, a resource request is dominated by a recipient.

For example, assuming that the subject of reservation is a Mobile Node (hereinafter referred to as "MN"), the MN cyclically transmits a refresh message. The refresh message is a message requesting the maintenance of a current session. A cycle, in which the refresh message is transmitted, is a refresh interval, and the refresh interval is determined when a corresponding session is created. The refresh interval is fixedly given to a corresponding session on a session-by-session basis.

The refresh message is transferred to a Correspondent Node (hereinafter referred to as "CN") through a path of routers which is established for a current session. Among the routers, a router, to which the MN is initially connected, is denominated as a serving router, and routers existing between the serving router and the CN are denominated as relay routers. The serving and relay routers perform resource allocation according to periods on the path established for the corresponding session.

If a refresh message is not received until a set refresh interval elapses, the serving and relay routers and the CN withdraw resources allocated for a corresponding session. The withdrawal of the resources allocated for the corresponding session means the termination of the corresponding session. A state time-out interval when the corresponding session terminates is determined based on a refresh interval. In general, the state time-out interval is determined as an integer times of the refresh interval.

In a wireless network, the mobility of a MN must be considered. Thus, a state management scheme in a wireless network is also required to consider the mobility of a MN.

FIG. 2 explains an RSVP operation under consideration of a situation where an MN is handed off in the existing wireless network.

Referring to FIG. 2, the MN transmits a refresh message at transmission points $t_0, t_1, \ldots, t_n, t_{n+1}$ specified by a refresh interval $T_{refresh}$. The refresh message propagates through a path corresponding to a corresponding session. If handoff occurs between $t_n$ and $t_{n+1}$, the MN establishes a new path through a target router to which the MN is to move. In order to establish the new path corresponding to the occurrence of the handoff, a certain time, called a delay time $T_{ho}$, is required.

However, although the handoff is completed, the old path still exists. Resources occupied by the old path are released when a state time-out interval elapses from $t_n$.

Therefore, the old path and the new path co-exist from a point of time when the handoff is completed to a point of time when the state time-out interval elapses. A period where both the paths co-exist is denominated a resource waste period $T_{waste}$. That is, the resources occupied by the old path after the new path is established can be considered a loss until they are released.

In order to prevent such a resource loss, it must be possible to rapidly release resources occupied by an old path when a new path is established by handoff.

To this end, among relay routers, a relay router where a new path branches off from an old path (hereinafter referred to as "crossover router") can request to forcedly release resources occupied by the old path which is connected so far as a serving router. With regard to this, since the crossover router is not the subject of session setup for a corresponding session, an authorization problem may be caused when the resources occupied by the old path are forcedly released. Thus, in order that the crossover router can request to forcedly release the resources occupied by the old path, a separate authorization process is required.

In another way to rapidly release resources occupied by an old path, a refresh interval may be reduced. However, if a refresh interval is reduced, an MN must transmit relatively many refresh messages, which increases the amount of resources necessary for transmitting the refresh messages.

Accordingly, there is a need for an improved resource reservation system and method in a wireless network which provides resource management under consideration of the mobility of a mobile node.

SUMMARY OF THE INVENTION

Exemplary embodiments of the present invention address at least the above problems and/or disadvantages and provide at least the advantages described below. Accordingly, an aspect of exemplary embodiments of the present invention is to provide a resource reservation system and method for minimizing a resource loss when handoff occurs.

An exemplary embodiment of the present invention provides a resource reservation system and method for releasing resources occupied by an old path without performing a separate authorization process when handoff occurs.

An exemplary embodiment of the present invention provides a resource reservation system and method for adjusting a refresh interval in such a manner as to minimize a resource loss when handoff occurs.

An exemplary embodiment of the present invention provides a resource reservation system and method for adjusting a refresh interval based on history information when handoff occurs.

An exemplary embodiment of the present invention provides a resource reservation system and method for decreasing a refresh interval when handoff is detected and increasing a refresh interval when handoff is completed.

Another aspect of exemplary embodiments of the present invention is to provide a resource reservation method in a wireless network, the resource reservation method including changing an old refresh interval in response to a handoff, propagating the changed refresh interval through at least one of a path supporting a corresponding session before the handoff and a path newly established due to handoff occurrence, and releasing resources on a path, which is a part of the path supporting the corresponding session before the handoff and is not used due to the handoff occurrence, based on the changed refresh interval when the handoff is completed.

Another aspect of exemplary embodiments of the present invention is to provide a resource reservation system in a wireless network, the resource reservation system including an MN, a CN corresponding to the MN, a serving router having a connection to the MN for a specific session, a target router to which the MN moves through handoff, a first path connecting the MN and the CN before the handoff, and a crossover router from which a second path connecting the MN and the CN branches off after the handoff, wherein the MN changes an old refresh interval in response to the handoff, and propagates the changed refresh interval through at least one of the first and second paths, thereby releasing resources allocated to a path, which is a part of the first path and connects the crossover router and the serving router, based on the changed refresh interval when the handoff is completed.

According to an exemplary implementation of the invention, the MN determines an increase or decrease in the old refresh interval by the rate of resources wasted after completion of the handoff, further determines an increase or decrease in the old refresh interval by the average frequency of handoff occurrence in a cell, and changes the old refresh interval by means of an increase/decrease value corresponding to the determinations by the rate of resources wasted after completion of the handoff and the average frequency of handoff occurrence.

According to another exemplary implementation of the invention, the MN decreases the old refresh interval at a point of time when the handoff is detected, and gradually increases the changed refresh interval if the handoff is not substantially performed until a predetermined time elapses.

Other objects, advantages and salient features of the invention will become apparent to those skilled in the art from the following detailed description, which, taken in conjunction with annexed drawings, discloses exemplary embodiments of the invention.

BRIEF DESCRIPTION OF THE DRAWINGS

The above and other aspects, features and advantages of the certain exemplary embodiments of present invention will be more apparent from the following detailed description when taken in conjunction with the accompanying drawings, in which.

Throughout the drawings, like reference numerals will be understood to refer to like elements, features and structures

DETAILED DESCRIPTION OF EXEMPLARY EMBODIMENTS

The matters exemplified in this description are provided to assist in a comprehensive understanding of exemplary embodiments of the invention. Accordingly, those of ordinary skill in the art will recognize that various changes and modifications of the embodiments described herein can be made without departing from the scope and spirit of the claimed invention. Also, descriptions of well-known functions and constructions are omitted for clarity and conciseness.

According to exemplary embodiments of the present invention, a description will be given on the assumption that the subject of session setup is an MN. However, it will be apparent to those skilled in the art that exemplary embodiments of the present invention may be applied even when the subject of session setup is a specific router.

Exemplary embodiments of the present invention propose a way for an MN to release resources occupied by a part of an old path, which does not overlap with a new path, as fast as possible when handoff is performed. Accordingly, exemplary embodiments of the present invention describe a way to adjust a refresh interval by using history information and a way to adjust a refresh interval as the movement of a MN is detected.

Further, in exemplary implementations, it can be assumed that a state time-out interval is equal to a refresh interval. However, it will be apparent to those skilled in the art that exemplary embodiments of the present invention may be applied even if a state time-out interval is determined as integer times of a refresh interval.

Figure 3:
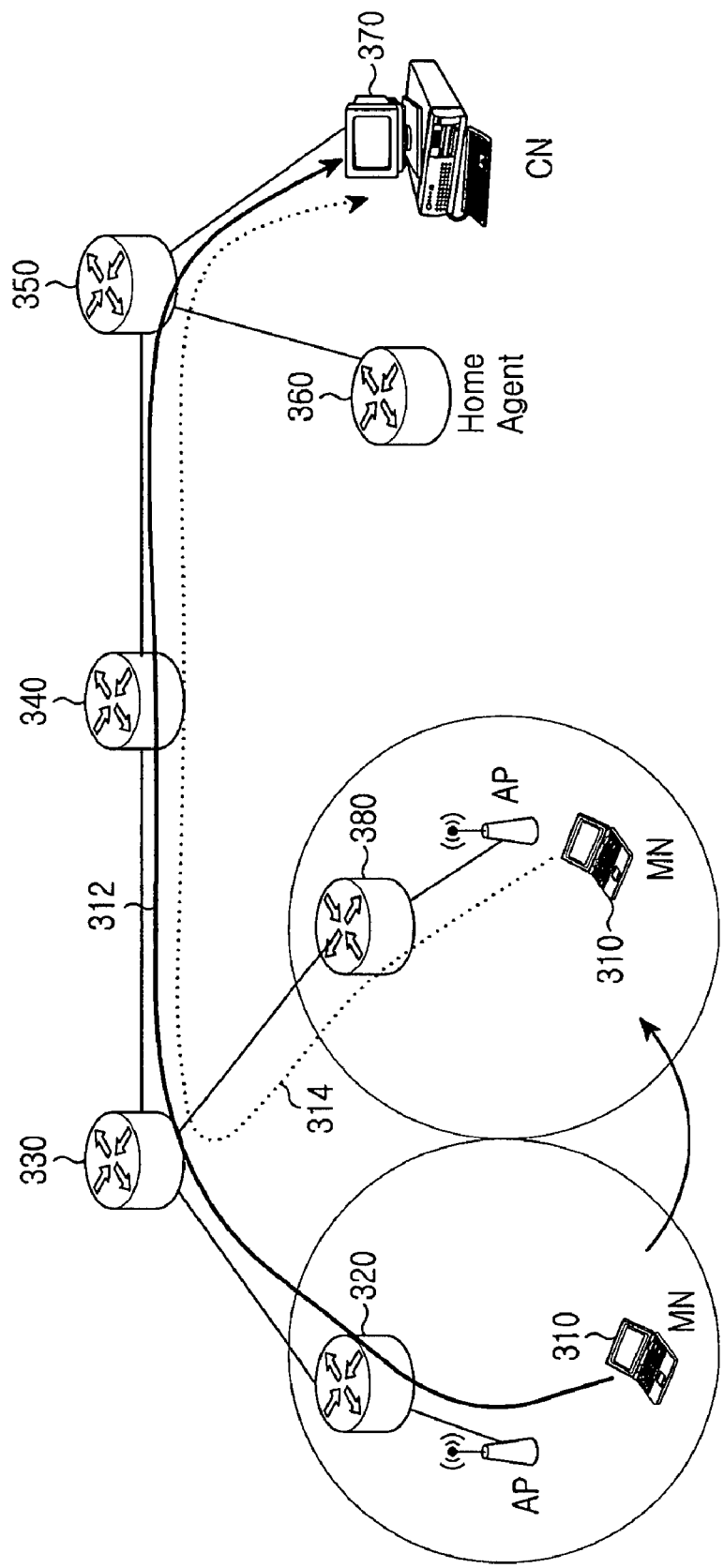
FIG. 3 is a view illustrating the architecture of a wireless network for applying exemplary embodiments of the present invention thereto.

FIG. 3 illustrates the architecture of a wireless network for applying exemplary embodiments of the present invention.

Referring to FIG. 3, a serving router 320 is a router which currently makes a connection to an MN 310 for a specific session. An old path 312 is an optimal path which is established so as to provide the specific session to the MN 310 connected to the serving router 320. The MN 310 is connected to a CN 370 through the old path 312.

A target router 380 is a router to which the MN newly makes a connection through handoff. A new path 314 is an optimal path which is established so as to provide the specific session to the MN 310 connected to the target router 380 through the handoff. When the handoff is completed, the MN 310 is connected to the CN 370 through the new path 314.

A crossover router 330 is a router located in a position where the old path 312 and the new path 314 branch off. Relay routers 340 and 350 collectively refer to routers existing between the crossover router 330 and the serving router 320, between the crossover router 330 and the target router 380, or between the crossover router 330 and the CN 370.

According to exemplary embodiments of the present invention, when the handoff is completed, resources occupied by a shared path where the old path 312 overlaps with the new path 314 can be maintained, and resources occupied by a remaining release path, that is, the old path excluding the shared path, can be rapidly released. The shared path is a path connecting the crossover router 330 and the CN 370, and the release path is a path connecting the crossover router 330 and the MN 310.

A. Example 1

Reference will now be made in detail to an exemplary embodiment of the present invention, with reference to the accompanying drawings.

The exemplary embodiment proposed herein provides a resource reservation system and method for adjusting a refresh interval by using history information when handoff occurs. Here, the history information is information created by a state management scheme having been previously conducted or sessions opened in a cell. The history information may be an average dwell time in a cell, an old refresh interval, the average number of MNs per cell, a handoff rate, and so on. The average dwell time in a cell means an average time during which MNs are located within a corresponding cell. The handoff rate means the frequency of handoffs per unit time of MNs within each cell. The history information can be managed cell by cell.

Figure 4:
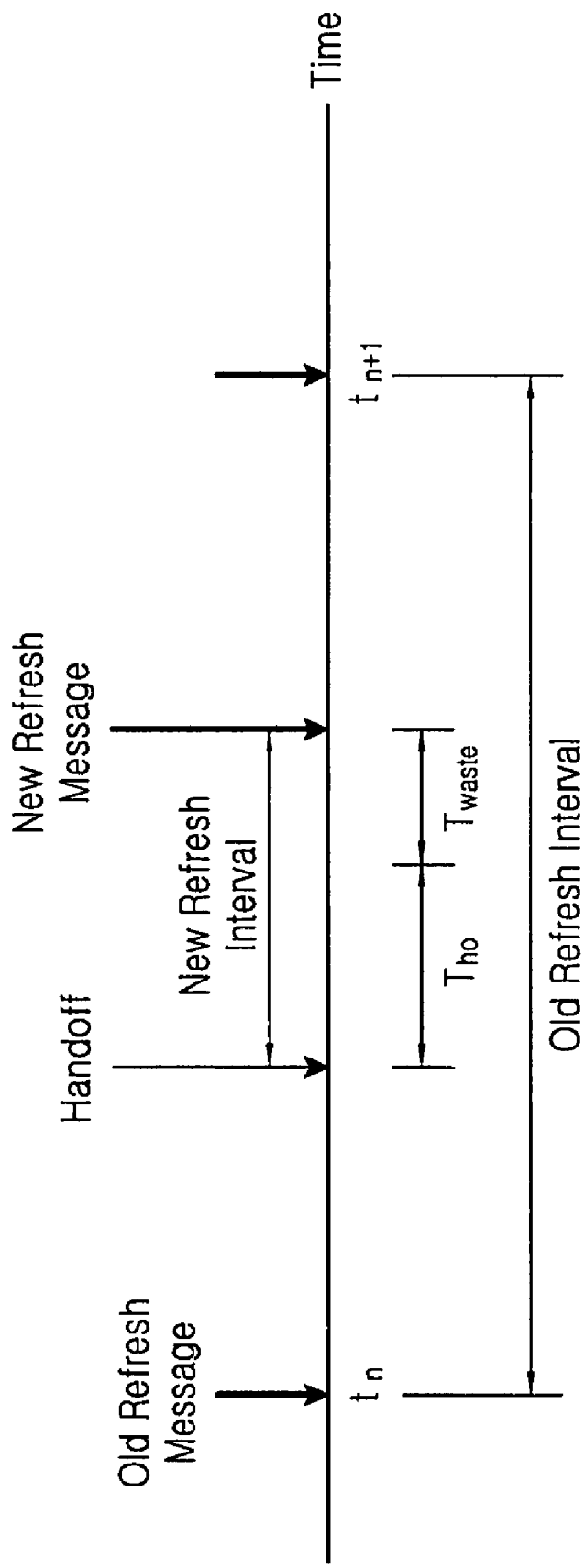
FIG. 4 is a view illustrating an example of transmitting a refresh message in a wireless network according to a an exemplary embodiment of the present invention.

FIG. 4 illustrates an example of transmitting a refresh message in a wireless network according to an exemplary embodiment of the present invention.

Referring to FIG. 4, if handoff didn't occur, an MN would transmit a refresh message at points $t_n$, $t_{n+1}$, specified by an old refresh interval. However, when handoff occurrence is detected between $t_n$ and $t_{n+1}$, the MN is handed off to a target cell. A handoff delay time $T_{ho}$ is required for performing the handoff. While the handoff is performed, the MN adjusts the old refresh interval. Here, the old refresh interval is adjusted to an optimal refresh interval capable of minimizing resource waste at the future handoff. The adjusted refresh interval may decrease as compared with the old refresh interval or may increase as compared with the old refresh interval, if necessary.

After the MN adjusts the old refresh interval, it transmits a refresh message containing information on the adjusted refresh interval. Such a refresh message propagates through a new path during the handoff.

Figure 5:
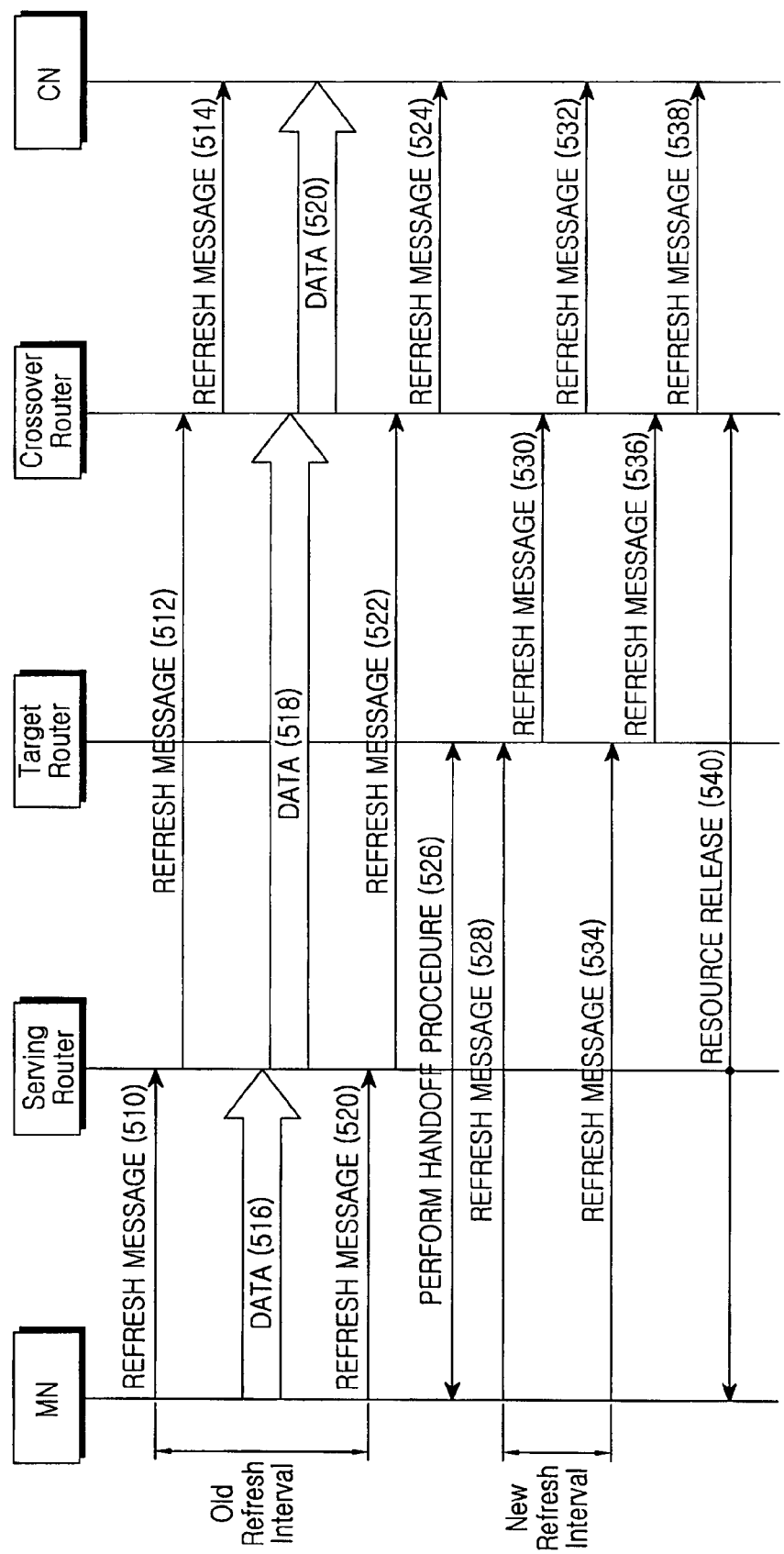
FIG. 5 is a view illustrating a signaling procedure in a wireless network according to an exemplary embodiment of the present invention.

FIG. 5 illustrates a signaling procedure in a wireless network according to an exemplary embodiment of the present invention.

Referring to FIG. 5, an MN cyclically transmits a refresh message to a serving router as per an old refresh interval (steps 510 and 520). The refresh message propagates as far as a CN through an old path (steps 512, 514, 522 and 524). Further, the MN transmits data to the serving router by using resources reserved via the refresh message (step 516). The data propagates as far as the CN through the old path (steps 518 and 520).

When handoff occurs, the MN performs a handoff procedure with a target router (step 516). At this point of time, the MN adjusts the old refresh interval by using history information. The adjusted refresh interval, that is, a new refresh interval, may have a relatively smaller value than the old refresh interval or may have a relatively greater value than the old refresh interval, if necessary.

While the handoff is performed, the MN transmits a refresh message containing the new refresh interval to the target router (step 528). The refresh message is transmitted at the time when the handoff is completed. The refresh message transmitted to the target router is further transmitted as far as the CN through a new path (steps 530 and 532). Thus, routers existing on the new path reset a state time-out interval based on the new refresh interval provided via the refresh message.

Subsequently, the MN cyclically transmits a refresh message as per the new refresh interval (step 534). This refresh message propagates as far as the CN through the new path (steps 536 and 538).

Meanwhile, routers existing on the old path wait for a refresh message to be transmitted as per the old refresh interval. However, since the MN completes the handoff to a new cell, the routers on the old path cannot receive the refresh message. Thus, the routers on the old path release resources allocated for the old path at a state time-out interval set by the old refresh interval (step 540).

Figure 6:
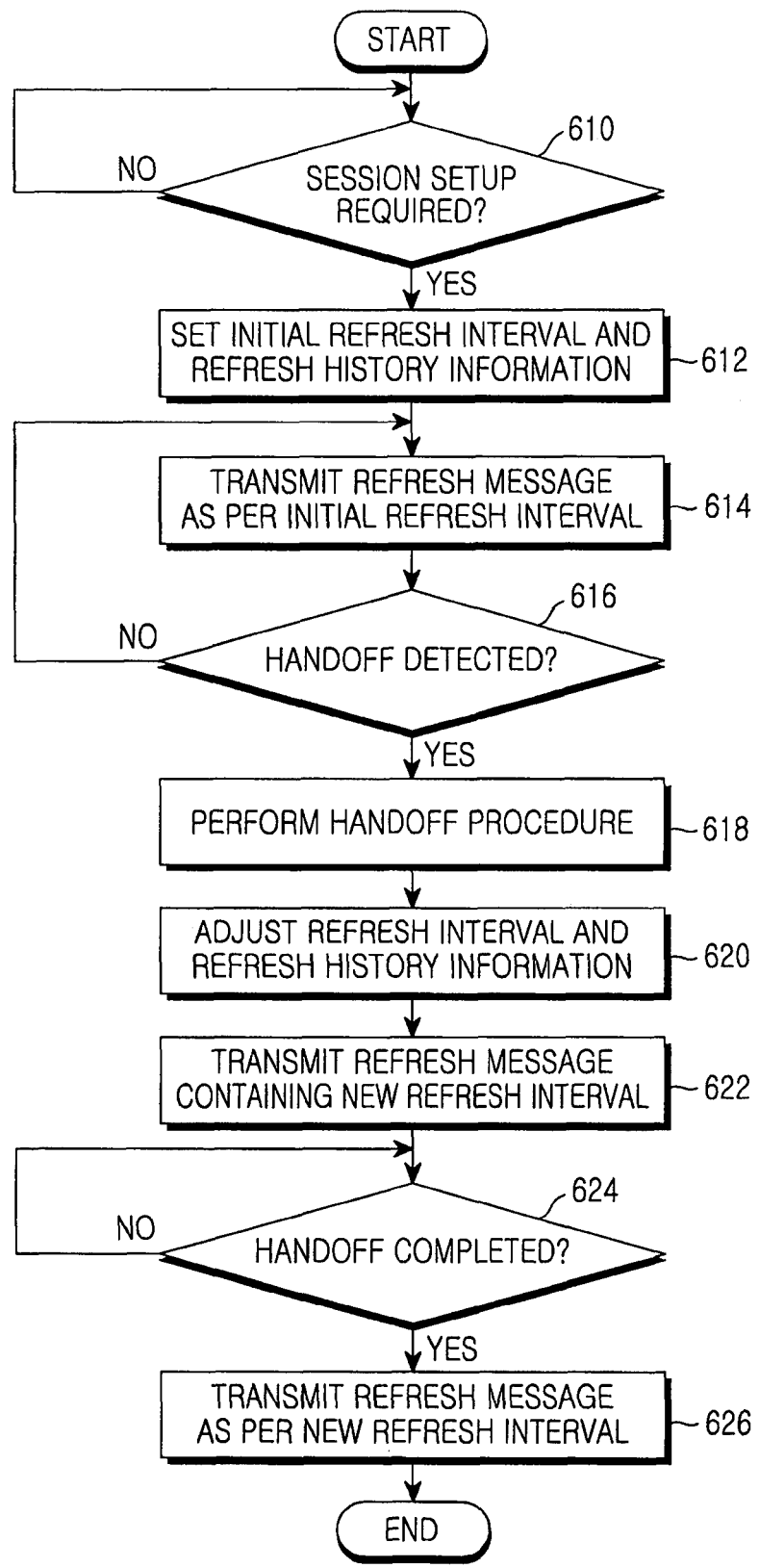
FIG. 6 is a flowchart illustrating a control flow in which a refresh interval is adjusted using history information according to an first embodiment of the present invention.

FIG. 6 illustrates a control flow in which a refresh interval is adjusted using history information according to an exemplary embodiment of the present invention.

Referring to FIG. 6, an MN determines in step 610 if it is required to set up a new session. The new session includes all affordable services in a wireless network, such as a voice service, a packet service, a broadcast service and so forth.

If the MN is required to set up the new session, it performs a procedure for setting up the session. An optimal path for the session is established by the session setup procedure. Establishing the path is based on the assumption that resources for the session are allocated by each router existing on the path.

In step 612, the MN sets an initial refresh interval $T_0$. The MN uses history information for setting the initial refresh interval $T_0$. For example, the initial refresh interval $T_0$ is determined by an average of old refresh intervals or set to a predetermined value. The predetermined value may be a refresh interval commonly used in a wireless network (for example, 30 sec). In step 612, the MN also refreshes history information by using the set initial refresh interval.

In step 614, the MN transmits a refresh message as per the initial refresh interval. The refresh message is transmitted through the above-mentioned established path. Thus, each router forming the path confirms that the MN intends to maintain the corresponding session. The MN not only cyclically transmits the refresh message as per the initial refresh interval, but also transmits data corresponding to the session through the path.

In step 616, the MN monitors whether or not handoff occurs. That is, the MN continually monitors whether or not it is necessary to move to another cell. If handoff occurrence is detected, the MN performs a handoff procedure in step 618. The MN establishes a new path corresponding to the corresponding session according to the handoff procedure. Establishing the new path includes a path between the MN and a target router as well as a path between the target router and a crossover router. A path previously established between the crossover router and a CN can be used in its entirety.

While the MN performs the handoff procedure, it adjusts the initial refresh interval in step 620. The MN uses history information for adjusting the refresh interval. In order to adjust the refresh interval, history information consisting of an old refresh interval $T_n$, a remaining time and a handoff rate is used. The remaining time is a time during which reserved resources are not used, and has the same value as $T_{waste}$. The handoff rate is the frequency of handoffs per unit time of MNs within a cell.

An example of adjusting a refresh interval by using the history information can be defined by the following generalized equation:

$$T_{n+1} = T_n + f(\alpha, \beta) \quad (1)$$

where $T_{n+1}$ denotes an adjusted refresh interval, $T_n$ denotes an nth refresh interval, $f(\alpha, \beta)$ denotes a refresh interval adjusting function, $\alpha$ denotes a remaining time, and $\beta$ denotes a handoff rate.

The refresh interval adjusting function may be divided into a scheme using the amount of waste resources and a scheme using a handoff rate.

An example of the scheme for adjusting a refresh interval by using the amount of waste resources can be defined by the following generalized equation:

$\delta \geq \varphi$: decrease refresh interval $\delta < \varphi$: increase refresh interval  (2)

where $\delta$ denotes a rate of resources wasted after handoff, and $\varphi$ denotes a threshold rate for control.

In Equation (2), $\delta$ can be defined by the following equation:

$$\delta = \alpha B_{req} \bigg/ \frac{B_{total}}{\overline{n}} T_n \quad (3)$$

where $B_{req}$ denotes resources actually used by an MN, $B_{total}$ denotes the overall resource of a cell, and $\overline{n}$ denotes the average number of MNs within a cell.

In Equation (3)

$$\frac{B_{total}}{\overline{n}} T_n$$

corresponding to the denominator denotes average resources allocated to an MN within one refresh interval, and $\alpha B_{req}$ corresponding to the numerator denotes resources wasted within one refresh interval after handoff.

An example of the scheme for adjusting a refresh interval by using a handoff rate can be defined by the following generalized equation:

$\beta \geq \dfrac{T_{holding}}{T_{dwell}}$: decrease refresh interval $\beta < \dfrac{T_{holding}}{T_{dwell}}$: increase refresh interval  (4)

where $\beta$ denotes a handoff rate, $T_{holding}$ denotes an actual dwell time of a specific MN in a current cell, and $T_{dwell}$ denotes an average dwell time of MNs within a cell.

Subsequently, the MN determines an adjusting value for adjusting the refresh interval by means of the refresh interval adjusting function $f(\alpha, \beta)$ using $\alpha$ and $\beta$. An example of determining an adjusting value for adjusting the refresh interval by means of the refresh interval adjusting function $f(\alpha, \beta)$ is shown in Table 1.

TABLE 1

| $\alpha$ | $\beta$ | $f(\alpha, \beta)$ |
|---|---|---|
| + | + | $+2\Delta$ |
| + | − | $-1\Delta$ |
| − | + | $+1\Delta$ |
| − | − | $-2\Delta$ |

In Table 1, $\Delta$ is a basic increase/decrease value which is determined considering the adjusting width of a refresh interval.

The refresh interval must be adjusted in a range satisfying the delay time required for performing handoff.

Therefore, if the refresh interval adjustment is completed, the MN determines a greater value as a new refresh interval, from among an adjusted refresh interval and an average handoff delay time. Here, the new refresh interval has a value smaller than the old refresh interval. However, the new refresh interval may have a value greater than the old refresh interval, if necessary. This can be expressed by the following generalized equation:

$$T_{n+1} = \max\{T_n + f(\alpha, \beta), \overline{T}_{ho}\} \quad (5)$$

where, $T_{ho}$ denotes an average handoff delay time.

A handoff delay time $T_{ho}$ for determining the average handoff delay time $T_{ho}$ is determined considering a handoff time, a crossover router detection time, resource resetting time and the like.

If the refresh interval is adjusted as mentioned above, the MN refreshes history information by means of the new refresh interval, and so on. The refreshed history information will be used for adjusting the refresh interval in the future.

In step 622, the MN configures a refresh message containing information on the new refresh interval, and transmits the configured refresh message. The refresh message propagates as far as the CN through the new path. Thus, routers existing on the new path reset a state time-out interval based on the new refresh interval contained in the refresh message.

In step 624, the MN determines if the handoff is completed. After the handoff is completed, the MN cyclically transmits a refresh message as per the new refresh interval adjusted as mentioned above.

In FIG. 6, a description has been given based on an operation of initially setting up a session and performing handoff for the first time. That is, a subsequently occurring handoff has not been described. However, when handoff additionally occurs, the handoff can be performed through the operations from step 616 to step 626.

B. Example 2

Another exemplary embodiment of the present invention provides a resource reservation system and method for changing a refresh interval at a point of time when handoff is detected and at a point of time when handoff occurrence is completed, respectively. In this system and method, an MN decreases a refresh interval if handoff occurrence is detected, so that the time required until an old path is released when handoff actually occurs can be reduced. Further, if the handoff is completed, the MN decreases the use of resources for transmitting a refresh message by increasing the refresh interval.

Figure 7:
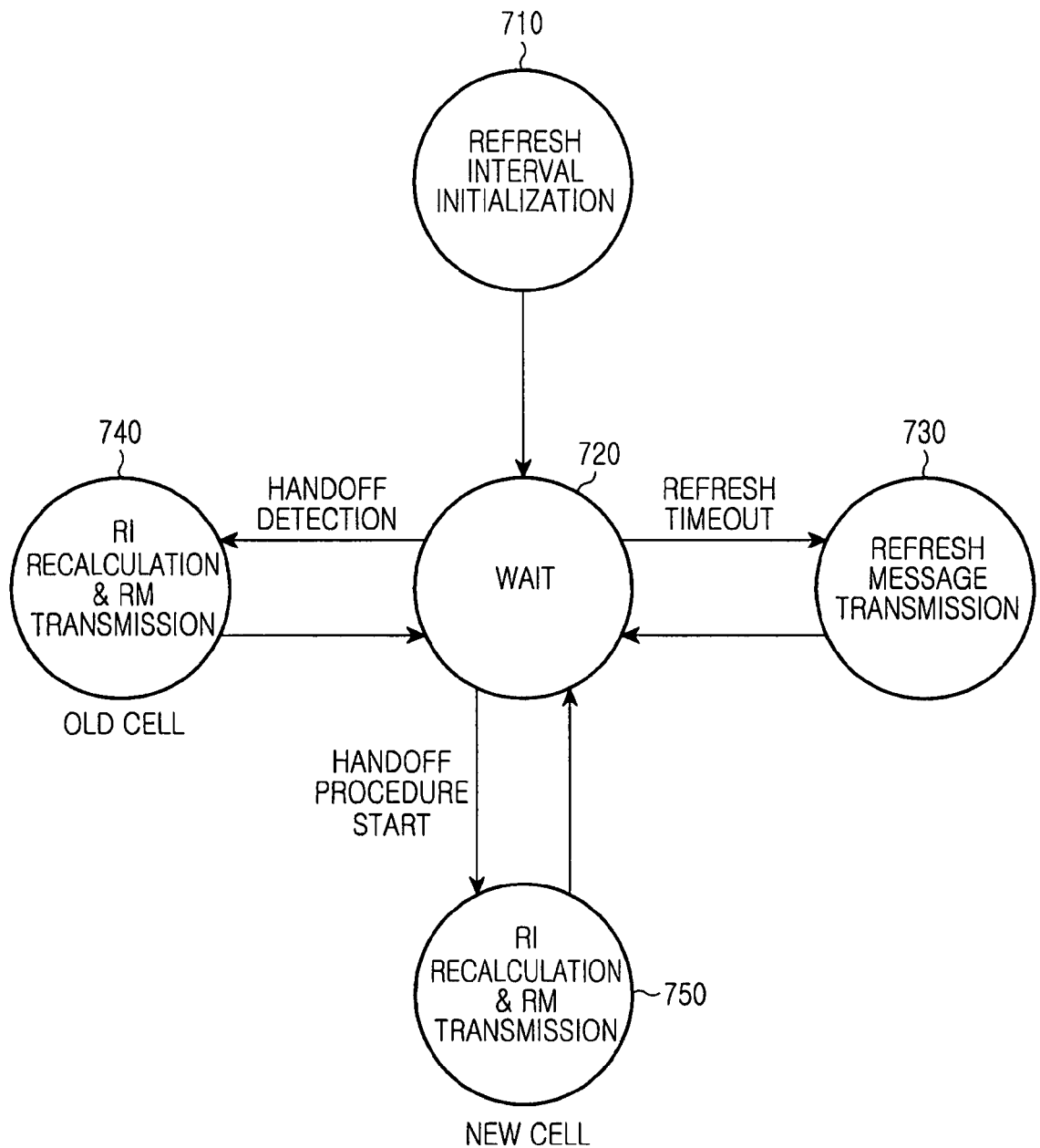
FIG. 7 is a view illustrating the state transition of an MN according to an exemplary embodiment of the present invention.

FIG. 7 illustrates the state transition of an MN according to an exemplary embodiment of the present invention.

Figure 1:
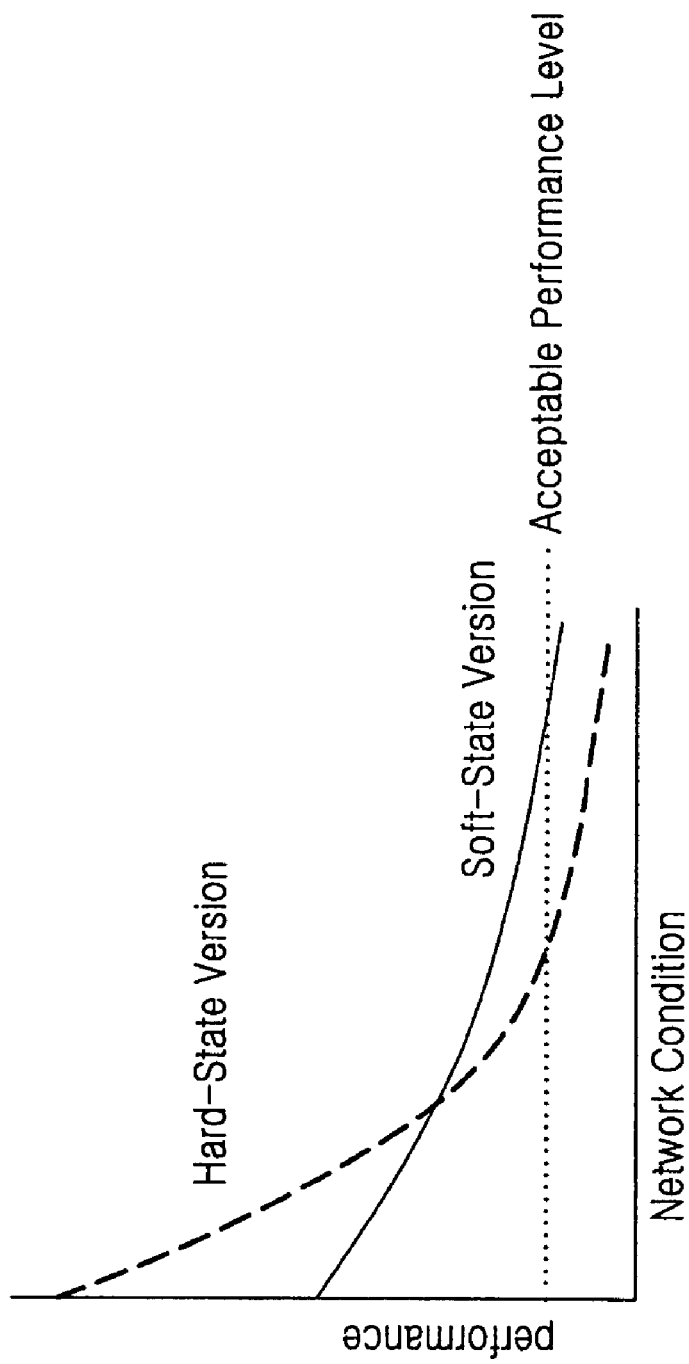
FIG. 1 is a graph comparing performances of state management schemes in a conventional wireless network.
Figure 2:
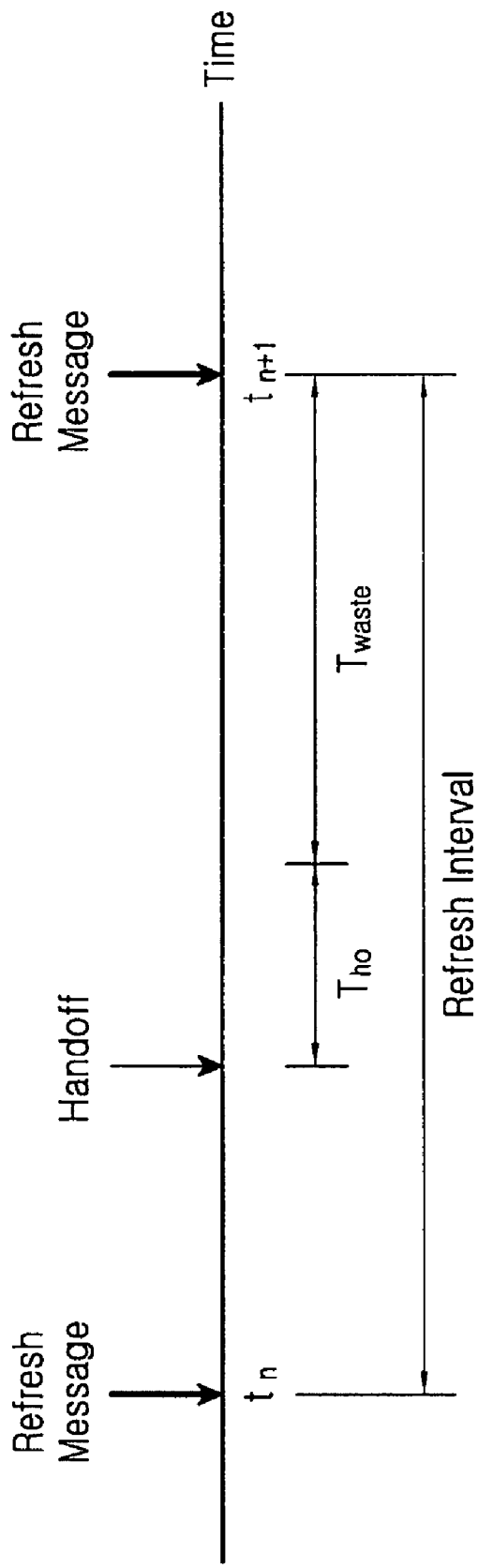
FIG. 2 is a view for explaining an RSVP operation under consideration of a situation where an MN is handed off.

Referring to FIG. 2, an MN establishes a path (i.e., resource allocation) for starting a desired session and sets a refresh interval in a refresh interval initialization state 710. The refresh interval is set using history information or set to a commonly used initial value. An initial value of 30 sec is commonly used in a wireless network.

If a refresh interval is initialized, the MN transitions to a wait state 720. In the wait state 720, the MN transmits data according to the set-up session. The MN checks in the wait state 720 if a refresh timeout as per the set refresh interval is reached. If the refresh timeout is reached, the MN transitions to a refresh message transmission state 730. In the refresh message transmission state 730, the MN transmits a refresh message through the set path.

After the MN transmits the refresh message, it transitions to the wait state 720 again. If handoff occurrence is detected in the wait state 720, the MN transitions to a refresh interval change state 740. In the refresh interval change state 740, the MN changes the refresh interval in response to the detection of handoff occurrence. Here, the changed refresh interval, that is, a new refresh interval, has a value smaller than the old refresh interval. This is intended to release the old path more rapidly when handoff is actually performed. If the refresh interval is changed, the MN transmits a refresh message containing the changed refresh interval through the old path.

After the MN transmits the refresh message, it transitions to the wait state 720 again. In the wait state 720, the MN monitors whether or not a handoff procedure for establishing a new path begins.

If the MN detects the beginning of the handoff procedure, it transitions to a refresh interval change state 750. In the refresh interval change state, the MN changes the previously changed refresh interval again. This is for determining a refresh interval to be used in a new cell. The changed refresh interval, that is, a new refresh interval, preferably has a value greater than the old refresh interval in order to reduce a resource loss due to a refresh message transmitted through the new path. The MN transmits a refresh message containing information on the new refresh interval through the new path. The refresh message is transmitted so as to reserve resource allocation for establishing the new path. If the handoff procedure is completed, the MN transitions to the wait state 720.

FIG. 7 does not illustrate a state transition for changing the refresh interval again when the handoff is not actually performed. However, in order to prevent such a situation from causing the wasting of resources according to refresh message transmission on the old path, a state transition for increasing the refresh interval when the handoff is not substantially performed, must be carried out.

Figure 8:
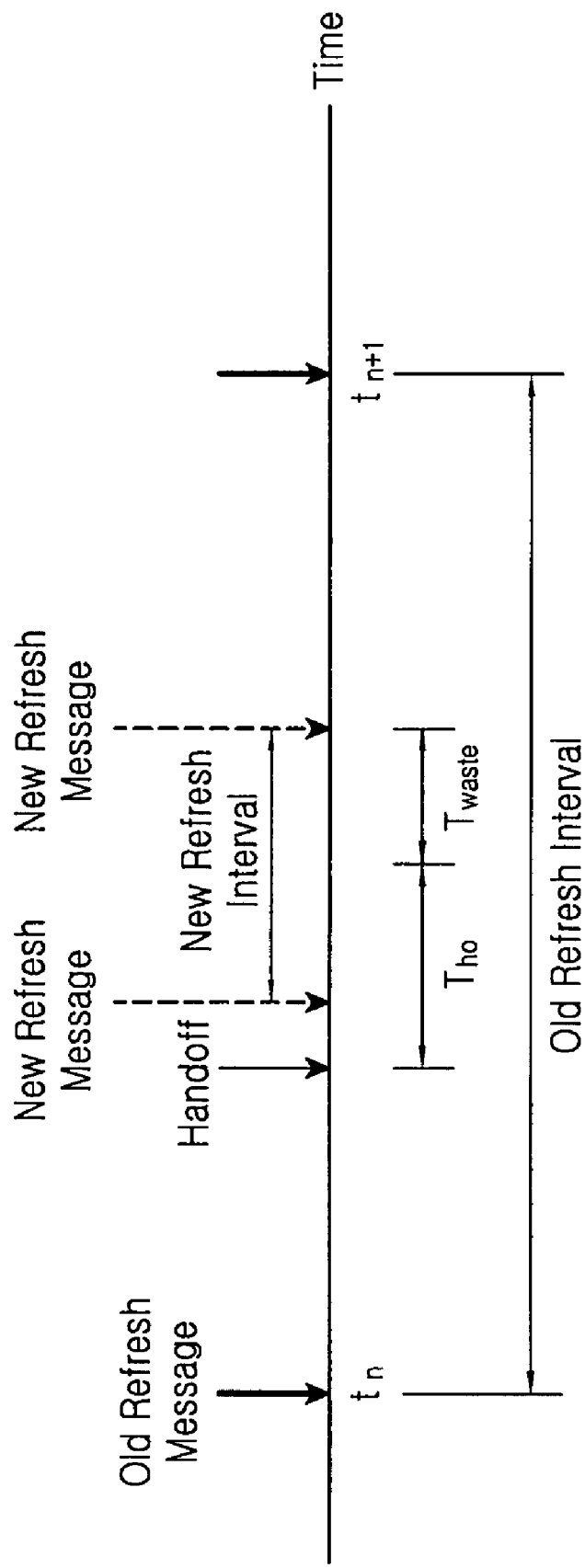
FIG. 8 is a view illustrating an example of transmitting a refresh message in a wireless network according to an exemplary embodiment of the present invention.

FIG. 8 illustrates an example of transmitting a refresh message in a wireless network according to the second embodiment of the present invention.

Referring to FIG. 8, if handoff didn't occur, an MN would transmit a refresh message at points $t_n$, $t_{n+1}$ specified by an old refresh interval. However, when handoff occurrence is detected between $t_n$ and $t_{n+1}$, the MN changes the old refresh interval. Here, the changed refresh interval, that is, a new refresh interval, has a value smaller than the old refresh interval. In the second embodiment of the present invention, the refresh interval is changed irrespective of whether or not the handoff is actually performed.

The MN transmits a refresh message containing information on the new refresh interval through an old path. Routers existing on the old path, which receive the refresh message, reset a state time-out point based on the new refresh interval provided via the refresh message. Further, the routers will release resources allocated for a corresponding session at the state time-out point.

In FIG. 8, it is assumed that handoff is performed immediately after handoff occurrence is detected. A handoff delay time $T_{ho}$ is required for performing the handoff. Otherwise, even if the handoff is performed later, the same operation as that to be described below will be carried out.

If a handoff procedure begins, the MN newly sets a refresh interval to be applied to a new cell, and transmits a refresh message containing information on the newly set refresh interval through a new path. According as the refresh message is transmitted, routers existing on the new path reserve resources for the new path, and sets a state time-out point based on the refresh interval contained in the refresh message.

Subsequently, the MN cyclically transmits a refresh message as per the new refresh interval. The refresh message propagates through a shared path and the new path established due to the handoff. The shared path is a path common to the old and new paths, that is, a path extending from a crossover router to a CN.

Meanwhile, routers existing on the old path connecting the crossover router and the serving router cannot receive the refresh message as per the new refresh interval. Thus, the routers existing on the old path connecting the crossover router and the serving router release resources allocated for the corresponding session at the state time-out point.

In the prior art, a resource waste period corresponds to a period from a point of time when handoff is completed to $T_{n+1}$ (i.e., state time-out point). However, when an exemplary embodiment of the present invention is applied, a resource waste period $T_{waste}$ corresponds to a period from a point of time when handoff is completed to a point of time when a refresh message is transmitted as per a new refresh interval. Thus, exemplary embodiments of the present invention can prevent resources from being wasted a period from a point of time when handoff is completed and then a refresh message is transmitted as per a new refresh interval to $T_{n+1}$.

Figure 9:
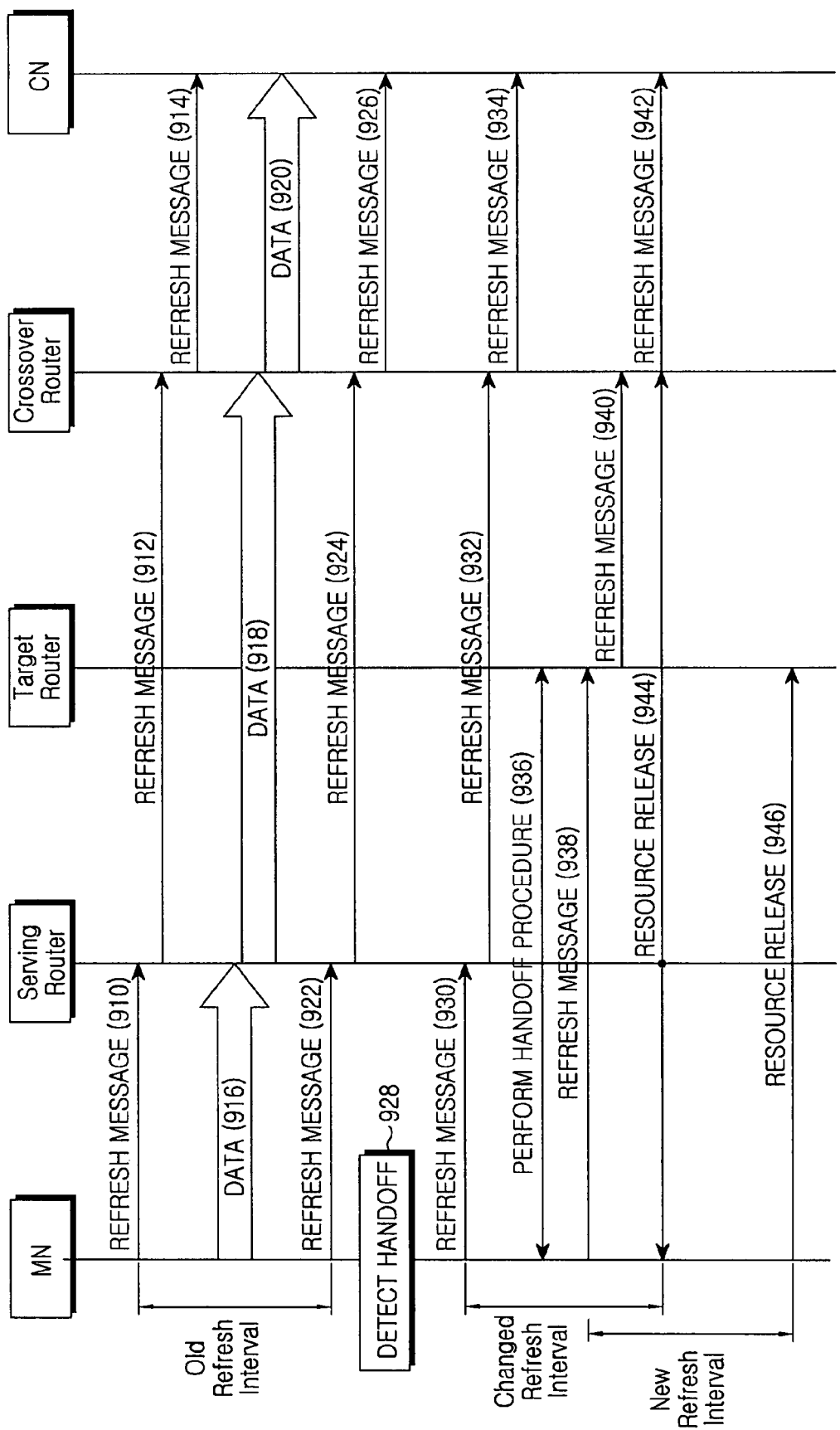
FIG. 9 is a view illustrating a signaling procedure in a wireless network according to an exemplary embodiment of the present invention.

FIG. 9 illustrates a signaling procedure in a wireless network according to an exemplary embodiment of the present invention.

Referring to FIG. 9, an MN cyclically transmits a refresh message to a serving router as per an old refresh interval (steps 910 and 920). The transmitted refresh message propagates through an old path (steps 912, 914, 924 and 926). Further, the MN transmits data to the serving router by using resources reserved via the refresh message (step 912). The data propagates through the old path (steps 918 and 920).

When handoff occurrence is detected, the MN changes the old refresh interval (step 928). The changed refresh interval has a relatively smaller value than the old refresh interval. The MN transmits a refresh message containing information on the changed refresh interval to the serving router (step 930). Thus, the refresh message propagates through the old path (steps 932 and 934). Routers existing on the old path change an old state time-out interval based on the changed refresh interval contained in the refresh message.

The MN performs a handoff procedure with a target router at a point of time when the handoff is needed (step 936). While the handoff is in progress, the MN determines a new refresh interval to be applied to a new cell. Further, the MN configures a refresh message containing information on the new refresh interval and transmits the configured refresh message to the target router (step 938). The refresh message propagates to routers existing on a new path (steps 940 and 942). The routers existing on the new path reserve resources for the new path in response to the receipt of the refresh message. The MN cyclically transmits a refresh message as per the new refresh interval (step 946).

Meanwhile, routers existing on the old path cannot receive the refresh message as per the changed refresh interval through the old path any longer. Thus, the crossover router, the serving router and the routers between these two routers, all of which exist on the old path, release resources allocated for the old path at a state time-out interval set by the changed refresh interval (step 944).

Figure 10:
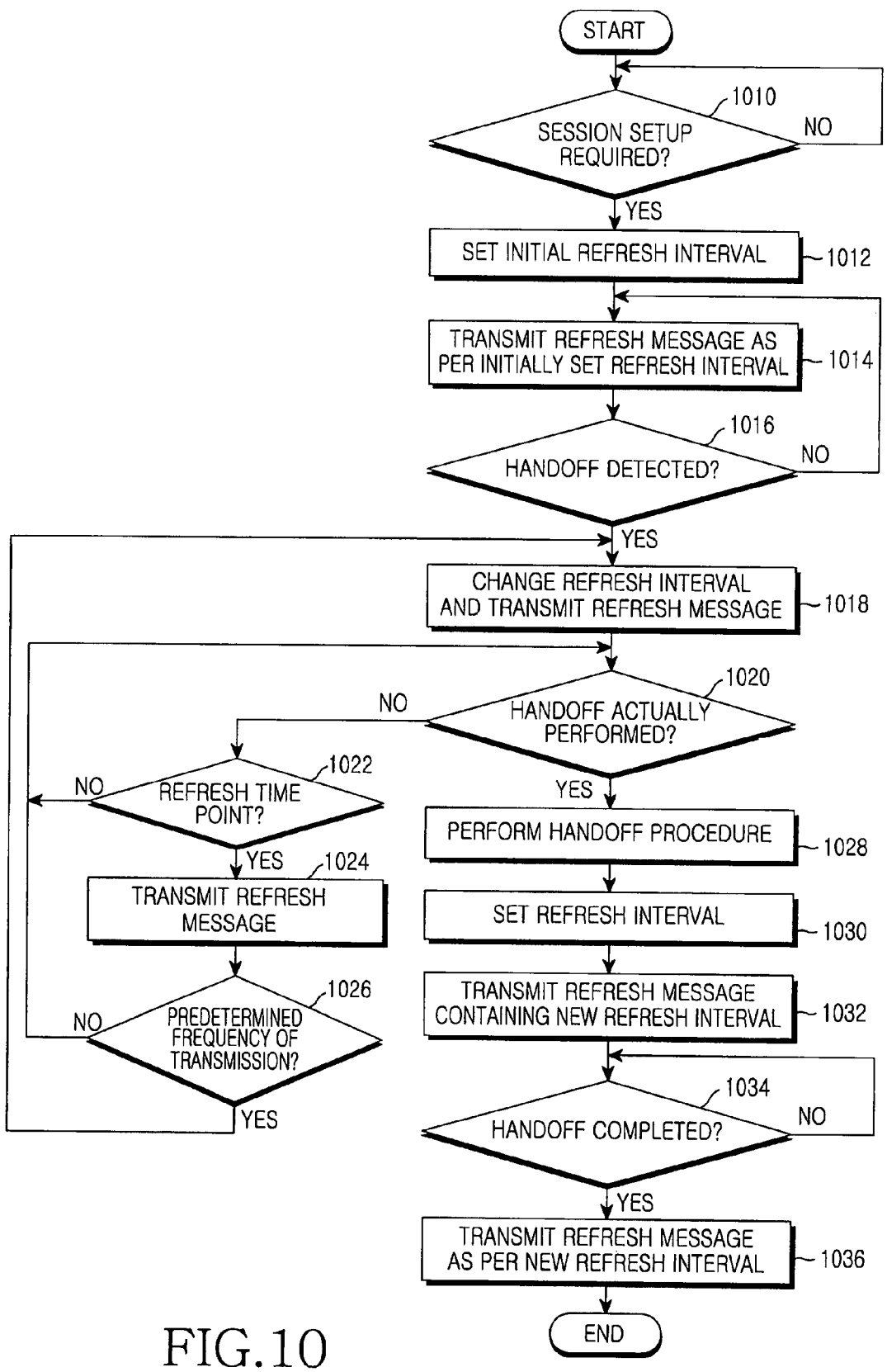
FIG. 10 is a flowchart illustrating a control flow in which a refresh interval is adjusted using history information according to an exemplary second embodiment of the present invention.

FIG. 10 illustrates a control flow in which a refresh interval is adjusted using history information according to an exemplary embodiment of the present invention.

Referring to FIG. 10, an MN determines in step 1010 if it is required to set up a new session. The new session includes all affordable services in a wireless network, such as a voice service, a packet service, a broadcast service and so forth.

If the MN is required to set up the new session, it performs a procedure for setting up the session. An optimal path for the session is established by the session setup procedure. Establishing the path is based on the assumption that resources for the session are allocated by each router existing on the path.

In step 1012, the MN sets an initial refresh interval $T_0$. The MN uses history information for setting the initial refresh interval $T_0$. For example, the initial refresh interval $T_0$ is determined by an average of old refresh intervals or set to a predetermined value. The predetermined value may be a refresh interval commonly used in a wireless network (for example, 30 sec). In step 1012, the MN also refreshes history information by using the set initial refresh interval.

In step 1014, the MN transmits a refresh message as per the initial refresh interval. The refresh message is transmitted through the above-mentioned established path. Thus, each router forming the path confirms that the MN intends to maintain the corresponding session. The MN not only cyclically transmits the refresh message as per the initial refresh interval, but also transmits data corresponding to the session through the path.

In step 1016, the MN monitors whether or not handoff occurs. If handoff occurrence is detected, the MN changes the initial refresh interval. The MN uses an average handoff delay time $T_{ho}$ for changing the refresh interval. A handoff delay time $T_{ho}$ for determining the average handoff delay time $T_{ho}$ is determined considering a handoff time, a crossover router detection time, resource resetting time and the like.

The refresh interval only has to be determined in a range satisfying the condition that it must be greater than the average handoff delay time $T_{ho}$ and smaller than the old refresh interval. This can be expressed by the following generalized equation:

$$T_n = \epsilon T_{ho} \tag{6}$$

where $\epsilon$ denotes a refresh interval change constant, and has a value grater than 1. However, $\epsilon$ must not be a constant which increases a changed refresh interval according to Equation (1) to a value greater than the old refresh interval.

If the refresh interval is changed, the MN transmits a refresh message containing information on the changed refresh interval to the serving router. The refresh message propagates through the old path. Thus, all routers existing on the old path change a state time-out interval based on the changed refresh interval contained in the refresh message.

In step 1020, the MN determines if the handoff is actually performed. If the handoff is not performed, the MN determines in step 1022 if a refresh timeout as per the changed refresh interval is reached. If the MN determines that the refresh timeout is reached, it transmits a refresh message to the serving router in step 1024. The refresh message propagates through the old path. Thus, all the routers existing on the old path change a state time-out interval based on the refresh interval contained in the refresh message. If the refresh interval contained in the refresh message is the same as the previous refresh interval, the routers need not change the state time-out interval.

After the MN transmits the refresh message, it determines in step 1026 if the refresh message is transmitted as per the changed refresh interval as many times as predetermined. This is intended to change the refresh interval again when the handoff does not actually occur until a certain time elapses after the detection of handoff occurrence. That is, it is not tolerable to connive at resource waste according to transmission of unnecessarily many refresh messages only because the probability of handoff occurrence is high.

If the MN determines that the refresh message is transmitted as many times as predetermined, it proceeds to step 1018, and changes the refresh interval again. At this time, the refresh interval is changed to an increased value. This can be expressed by the following generalized equation:

$$T_{n+1} = \min\{\rho T_n, T_0\} \tag{7}$$

where $\rho$ denotes a refresh interval change constant, and has a value grater than 1. As an example, $\rho$ is set to a value equal to or smaller than 1.3 in the case of the RSVP. With regard to this, the refresh is preferably changed in a range not exceeding the initially set refresh interval.

If the handoff is actually performed, the MN carries out a handoff procedure in step 1028. The MN establishes a new path corresponding to the corresponding session according to the handoff procedure. Establishing the new path includes a path between the MN and a target router as well as a path between the target router and a crossover router. A path previously established between the crossover router and a CN can be used in its entirety.

In step 1030, the MN newly sets a new refresh interval to be used in a call to which the MN is to move. This new refresh interval can be set in the same manner as in step 1012 in which the initial refresh interval is set. In step 1032, the MN transmits a refresh message containing information on the new refresh interval. The refresh message is transmitted through the new path set by the handoff procedure. Upon receiving the refresh message, routers existing on the new path reserve resources for establishing the new path, and reset a state time-out interval based on the new refresh interval contained in the refresh message.

In step 1034, the MN determines if the handoff procedure in progress is completed. If the handoff procedure is completed, in step 1036, the MN cyclically transmits a refresh message as per the new refresh interval. The refresh message propagates through the new path set by the handoff procedure. Thus, upon receiving the refresh message, routers existing on the new path reserve resources for maintaining the new path.

If the handoff is completed, the MN cannot transmit a refresh message as per the previously changed refresh interval. Thus, routers existing on the old path cannot receive a refresh message as per the previously changed refresh interval, and thus do not reserve resources for the old path any longer at a state time-out interval set based on the previously changed refresh interval. This means that the old path is released.

In FIG. 10, a description has been given based on an operation of initially setting up a session and performing handoff for the first time. That is, a subsequently occurring handoff has not been described. However, when additional handoffs occur, the old path can be rapidly released through the operations from step 1016 to step 1036.

As described above, according to a resource reservation system and method of exemplary embodiments of the present invention, a refresh interval is changed when handoff occurs, and based thereon, resources according to an old path can be rapidly released. This can prevents resource waste which may occur at handoff, thereby improving the utilization efficiency of resources in a wireless network. Further, since additional procedures, such as an authorization process, are not required, an increased load is not imposed on the resource reservation system.

The above-described exemplary embodiments of a resource reservation system and method in wireless network may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, et and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A resource reservation method in a wireless network, the resource reservation method comprising the steps of:
    changing an old refresh interval in response to a handoff by using history information when the handoff is in progress;
    propagating the changed refresh interval through at least one of a path supporting a corresponding session before the handoff and a path newly established due to handoff occurrence; and
    releasing resources on a path, which is a part of the path supporting the corresponding session before the handoff and is not used due to the handoff occurrence, based on the changed refresh interval when the handoff is completed.

2. The resource reservation method as claimed in claim 1, wherein the step of changing the old refresh interval comprises the steps of:
    determining an increase or decrease in the old refresh interval by a rate of resources wasted after completion of the handoff;
    determining an increase or decrease in the old refresh interval by an average frequency of handoff occurrence in a cell; and
    determining an increase/decrease value for the old refresh interval based on the increases or decreases determined by the rate of resources wasted after completion of the handoff and the average frequency of handoff occurrence in a cell.

3. The resource reservation method as claimed in claim 2, wherein the refresh interval changed by means of the determined increase/decrease value does not exceed an average handoff delay time in the cell.

4. The resource reservation method as claimed in claim 3, wherein the decrease in the old refresh interval is determined when the rate of resources wasted after completion of the handoff is equal to or greater than a threshold rate, and the increase in the old refresh interval is determined when the rate of resources wasted after completion of the handoff is smaller than the threshold rate.

5. The resource reservation method as claimed in claim 4, wherein the rate of resources wasted after completion of the handoff is calculated by a following equation, $$\delta = \alpha B_{req} \bigg/ \frac{B_{total}}{\bar{n}} T_n$$

wherein $$\frac{B_{total}}{\bar{n}} T_n$$

denotes average resources allocated to an MN (Mobile Node) within one refresh interval, $\alpha B_{req}$ denotes resources wasted within one refresh interval after the handoff, $B_{req}$ denotes resources actually used by the MN, $B_{total}$ denotes an overall resource of a cell, and $\bar{n}$ denotes an average number of MNs within the cell.

6. The resource reservation method as claimed in claim 4, wherein the decrease in the old refresh interval is determined when the average frequency of handoff occurrence in a cell is equal to or greater than a ratio between an actual dwell time of a specific MN in a current cell and an average dwell time of MNs within the current cell, and the increase in the old refresh interval is determined when the average frequency of handoff occurrence in a cell is smaller than the ratio between an actual dwell time of a specific MN in a current cell and an average dwell time of MNs within the current cell.

7. The resource reservation method as claimed in claim 6, wherein the step of determining the increase/decrease value comprises the step of:
determining a double of a predetermined basic increase/decrease value as the increase value when the increase in the old refresh interval is determined by the rate of resources wasted after completion of the handoff, and the increase in the old refresh interval is determined by the average frequency of handoff occurrence in a cell;
determining the predetermined basic increase/decrease value as the decrease value when the increase in the old refresh interval is determined by the rate of resources wasted after completion of the handoff, and the decrease in the old refresh interval is determined by the average frequency of handoff occurrence in a cell;
determining the predetermined basic increase/decrease value as the increase value when the decrease in the old refresh interval is determined by the rate of resources wasted after completion of the handoff, and the increase in the old refresh interval is determined by the average frequency of handoff occurrence in a cell; and
determining the double of the predetermined basic increase/decrease value as the decrease value when the decrease in the old refresh interval is determined by the rate of resources wasted after completion of the handoff, and the decrease in the old refresh interval is determined by the average frequency of handoff occurrence in a cell.

8. The resource reservation method as claimed in claim 1, wherein the step of changing the old refresh interval comprises the step of changing the old refresh interval at a point of time when the handoff occurrence is detected.

9. The resource reservation method as claimed in claim 8, wherein the step of changing the old refresh interval comprises the step of changing the old refresh interval by a multiplication of the average handoff delay time and a refresh interval change constant having a value greater than 1, in such a manner that the changed refresh interval falls within a range greater than the average handoff delay time and smaller than the old refresh interval.

10. The resource reservation method as claimed in claim 8, wherein, if the handoff occurrence is detected, but the handoff is not actually performed during a predetermined time, the changed old refresh interval is increased at a certain rate.

11. The resource reservation method as claimed in claim 10, wherein, when the changed refresh interval is increased at the certain rate, the increased refresh interval is not increased beyond an initial refresh interval.

12. A resource reservation system in a wireless network, the resource reservation system comprising:
an MN (Mobile Node);
a CN (Correspondent Node) corresponding to the MN;
a serving router having a connection to the MN for a specific session;
a target router to which the MN moves through handoff;
a first path connecting the MN and the CN before the handoff; and
a crossover router from which a second path connecting the MN and the CN branches off after the handoff, wherein the MN changes an old refresh interval in response to the handoff by using history information, and propagates the changed refresh interval through at least one of the first and second paths, thereby releasing resources allocated to a path, which is a part of the first path and connects the crossover router and the serving router, based on the changed refresh interval when the handoff is completed.

13. The resource reservation system as claimed in claim 12, wherein the MN determines an increase or decrease in the old refresh interval by a rate of resources wasted after completion of the handoff, determines an increase or decrease in the old refresh interval by an average frequency of handoff occurrence in a cell, and determines an increase/decrease value for the old refresh interval based on the increases or decreases determined by the rate of resources wasted after completion of the handoff and the average frequency of handoff occurrence in a cell.

14. The resource reservation system as claimed in claim 13, wherein the refresh interval changed by means of the determined increase/decrease value does not exceed an average handoff delay time in the cell.

15. The resource reservation system as claimed in claim 14, wherein the MN determines to decrease the old refresh interval when the rate of resources wasted after completion of the handoff is equal to or greater than a threshold rate, and determines to increase the old refresh interval when the rate of resources wasted after completion of the handoff is smaller than the threshold rate.

16. The resource reservation system as claimed in claim 15, wherein the MN calculates the rate of resources wasted after completion of the handoff by a following equation, $$\delta = \alpha B_{req} / \frac{B_{total}}{\bar{n}} T_n$$

wherein $$\frac{B_{total}}{\bar{n}} T_n$$

denotes average resources allocated to an MN within one refresh interval, $\alpha B_{req}$ denotes resources wasted within one refresh interval after the handoff, $B_{req}$ denotes resources actually used by the MN, $B_{total}$ denotes an overall resource of a cell, and $\bar{n}$ denotes an average number of MNs within the cell.

17. The resource reservation system as claimed in claim 15, wherein the MN determines to decrease the old refresh interval when the average frequency of handoff occurrence in a cell is equal to or greater than a ratio between an actual dwell time of a specific MN in a current cell and an average dwell time of MNs within the current cell, and determines to increase the old refresh interval when the average frequency of handoff occurrence in a cell is smaller than the ratio between an actual dwell time of a specific MN in a current cell and an average dwell time of MNs within the current cell.

18. The resource reservation system as claimed in claim 17, wherein the MN determines a double of a predetermined basic increase/decrease value as the increase value when the increase in the old refresh interval is determined by the rate of resources wasted after completion of the handoff and the increase in the old refresh interval is determined by the average frequency of handoff occurrence in a cell, determines the predetermined basic increase/decrease value as the decrease value when the increase in the old refresh interval is determined by the rate of resources wasted after completion of the handoff and the decrease in the old refresh interval is determined by the average frequency of handoff occurrence in a cell, determines the predetermined basic increase/decrease value as the increase value when the decrease in the old refresh interval is determined by the rate of resources wasted after completion of the handoff and the increase in the old refresh interval is determined by the average frequency of handoff occurrence in a cell, and determines the double of the predetermined basic increase/decrease value as the decrease value when the decrease in the old refresh interval is determined by the rate of resources wasted after completion of the handoff and the decrease in the old refresh interval is determined by the average frequency of handoff occurrence in a cell.

19. The resource reservation system as claimed in claim 12, wherein the MN changes the old refresh interval at a point of time when the handoff occurrence is detected.

20. The resource reservation system as claimed in claim 19, wherein the MN changes the old refresh interval by a multiplication of the average handoff delay time and a refresh interval change constant having a value greater than 1, in such a manner that the changed refresh interval falls within a range greater than the average handoff delay time and smaller than the old refresh interval.

21. The resource reservation system as claimed in claim 19, wherein, if the handoff occurrence is detected, but the handoff is not actually performed during a predetermined time, the MN increases the changed old refresh interval at a certain rate.

22. The resource reservation system as claimed in claim 21, wherein the MN increases the changed refresh interval at the certain rate in such a manner as not to be increased beyond an initial refresh interval.

23. A computer implemented resource reservation method in a wireless network, the resource reservation method comprising the steps of:
changing an old refresh interval in response to a handoff by using history information when the handoff is in progress;
propagating the changed refresh interval through at least one of a path supporting a corresponding session before the handoff and a path newly established due to handoff occurrence; and
releasing resources on a path, which is a part of the path supporting the corresponding session before the handoff and is not used due to the handoff occurrence, based on the changed refresh interval when the handoff is completed.

24. A non-transitory computer-readable recording medium storing a program for a resource reservation method in a wireless network, the program comprising the steps of:
a first set of instructions for changing an old refresh interval in response to a handoff by using history information when the handoff is in progress;
a second set of instructions for propagating the changed refresh interval through at least one of a path supporting a corresponding session before the handoff and a path newly established due to handoff occurrence; and
a third set of instructions for releasing resources on a path, which is a part of the path supporting the corresponding session before the handoff and is not used due to the handoff occurrence, based on the changed refresh interval when the handoff is completed.

* * * * *